United States Patent [19]

Long et al.

[11] Patent Number: 5,126,723
[45] Date of Patent: Jun. 30, 1992

[54] KEYBOARD-MOUNTED CURSOR POSITION CONTROLLER

[75] Inventors: Shyh L. Long, Geylang; Hariram Ramachandran; Soo H. Quek, both of Singapore, all of Singapore

[73] Assignee: Hewlett-Packard Company, Palo Alto, Calif.

[21] Appl. No.: 448,761

[22] Filed: Dec. 11, 1989

[51] Int. Cl.$^5$ ............................................... G09G 1/00
[52] U.S. Cl. ................................. 340/710; 340/706; 74/471 XY
[58] Field of Search .............. 340/706, 709, 710, 711; 74/741 XY

[56] References Cited

U.S. PATENT DOCUMENTS

| | | | |
|---|---|---|---|
| 4,313,113 | 1/1982 | Thornburg | 340/709 |
| 4,692,756 | 9/1987 | Clark | 340/709 |
| 4,712,101 | 12/1987 | Culver | 340/710 |
| 4,724,715 | 2/1988 | Culver | 340/710 |
| 4,799,049 | 1/1989 | Avila | 340/709 |
| 4,823,634 | 4/1989 | Culver | 340/710 |

FOREIGN PATENT DOCUMENTS 60-235227 11/1985 Japan .

OTHER PUBLICATIONS

IBM Technical Disclosure Bulletin, vol. 21, No. 7, Dec. 1978, pp. 3026-3027.

*Primary Examiner*—Ulysses Weldon
*Assistant Examiner*—Matthew Luu
*Attorney, Agent, or Firm*—Roland I. Griffin; Alan H. Haggard

[57] ABSTRACT

A keyboard mounted, hand-operable input device for controlling the movement of a marker on a computer display is described and includes a tray which is elongated along a first axis, has right and left closed ends and is mounted for translational movement along its first axis. A hand-operable roller is rotatably mounted in the tray and is movable therewith. A rotary encoder is mounted on and movable with the tray and is maintained in engagement with the roller so that it provides signals indicative of the roller's rotary motion. A translational encoder is movable with the tray and provides signals indicative of translational movements of the tray. By directly coupling the roller to the rotary encoder and having both move with the tray, accurate rotary motion indications are thereby derived.

11 Claims, 4 Drawing Sheets

KEYBOARD-MOUNTED CURSOR POSITION CONTROLLER

FIELD OF THE INVENTION

This invention relates to a mechanism for controlling the position of a marker on a computer display and, more particularly, to a cursor position controller which enables the user's hands to remain on the display's keyboard.

BACKGROUND OF THE INVENTION

Many devices exist for controlling the position of a cursor on a display screen. One of the more widely used is the mouse, but it exhibits two major drawbacks. The first is that the user's hand must be removed from the keyboard to control the movement and position of the mouse. The second is that a flat surface adjacent to the keyboard must be reserved for the mouse. To overcome those problems, a number of alternative mechanisms have been devised. In U.S. Pat. No. 4,313,113 to Thornburg, directional movement keys are incorporated directly into the keyboard. In Japanese Patent 60-235227 to Masuta, a pair of orthogonally oriented rollers are incorporated in the keyboard and by manipulation, enable the movement of a cursor across the display's screen. In the IBM Technical Disclosure Bulletin, Vol. 21, No. 7, pp. 3026 and 3027, a similar arrangement is shown but the rollers are incorporated in a separate, free-standing control unit. In U.S. Pat. No. 4,692.756 to Clark, a moveable sleeve is mounted on the keyboard and is hand operable, both vertically and horizontally, to provide cursor control signals.

Recently, a new mechanism has been developed which provides directional control signals for a cursor, but allows both of the users hands to remain in contact with the keyboard. In U.S. Pat. No. 4,712,101 to Culver, this mechanism is shown as comprising a rotatable shaft on which a hollow cylinder is mounted. Rotation of the cylinder rotates the shaft through frictional engagement. The cylinder is also movable longitudinally along the axis of the shaft. One encoder is coupled to the shaft and provides rotary shaft movement signals and another encoder is coupled to the cylinder via a wire and pulley system to provide signals indicative of the cylinder's longitudinal movements. A modified version of the this cursor control mechanism is disclosed by Culver in U.S. Pat. No. 4,724,715. Here again, longitudinal movements of a cylinder along a shaft are transmitted by a wire and pulley system and the cylinder's rotary motion is determined via a mechanical linkage or a mouse-like structure.

In U.S. Pat. No. 4,799,049, another version of a cylinder-cursor movement device is shown by Avila et al. Avila et al. employ a mouse which is mounted in contact with a cylinder which both rotates and translates to provide cursor-position control signals.

In copending U.S. patent applications Ser. Nos. 07/309,839 to Ramachandran and 07/309,829 to Cloutier et al., both assigned to the same assignee as this application, roller-operated, cursor control mechanisms are described. In both of those mechanisms, the roller is mounted on a splined shaft, so that the roller can both translate along the axis of the shaft, while simultaneously imparting rotary motion thereto.

Each of the above roller or cylinder based cursor-control mechanisms exhibits a weakness in translating the rotational motion of the roller to an encoder. In the aforementioned copending applications, after continuous use, internal wear in the cylinder creates erratic translation of the cylinder's rotary motion to the splined shaft and thence to a rotary encoder. The gearing and cable/pulley systems described in the Culver patent also exhibit similar "hysteresis" problems—especially after wear has occurred in the mechanism. The Avila et al. mechanism requires a relatively constant level of friction between the mouse and the cylinder for there to be consistent output readings. Any contaminants appearing on the cylinder will tend to create an erratic interface between the cylinder and mouse, thereby resulting in potentially erroneous readings.

Accordingly, it is an object of this invention to provide a keyboard-mounted, cursor position controller which exhibits consistent and accurate rotary position outputs.

It is another object of this invention to provide a keyboard mounted, cursor position controller wherein usage wear is minimized.

It is still another object of this invention to provide an improved roller-based, cursor position controller.

SUMMARY OF THE INVENTION

A keyboard mounted, hand-operable input device for controlling the movement of a marker on a computer display is described and includes a tray which is elongated along a first axis; has right and left closed ends; and is mounted for translational movement along its first axis. A hand-operable roller is rotatably mounted in the tray and is movable therewith. A rotary encoder is mounted on and movable with the tray and is maintained in engagement with the roller so that it provides signals indicative of the roller's rotary motion. A translational encoder is movable with the tray and provides signals indicative of translational movements of the tray. By directly coupling the roller to the rotary encoder and having both move with the tray, accurate rotary motion indications are thereby derived.

DETAILED DESCRIPTION OF THE INVENTION

Figure 1:
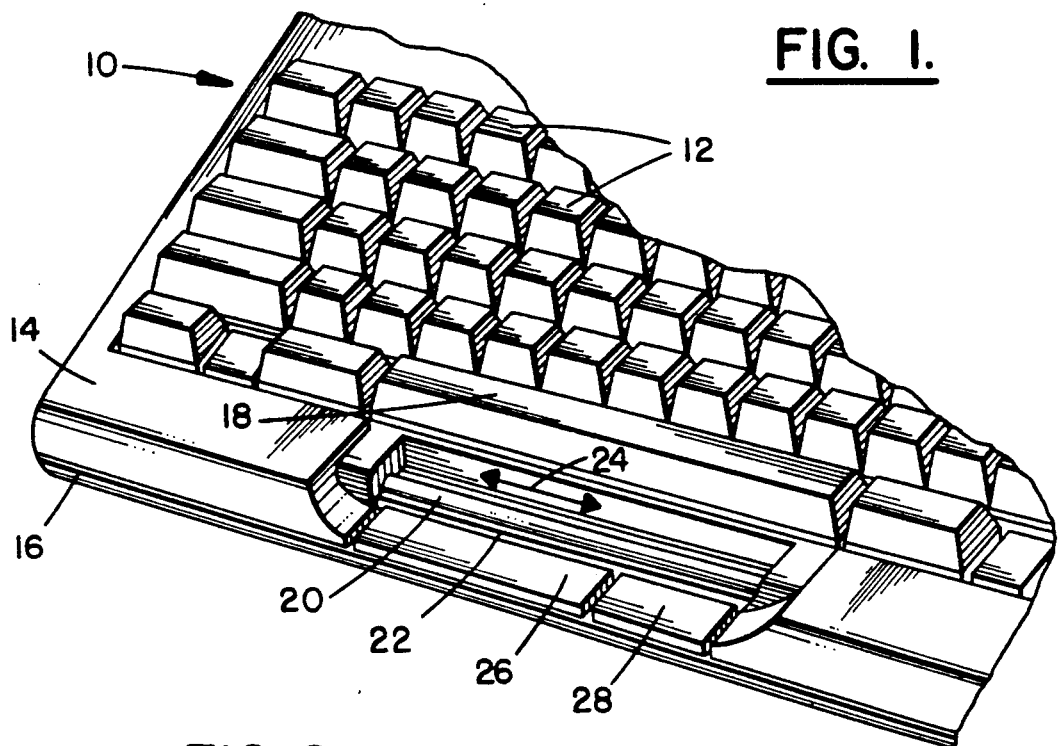
FIG. 1 is a perspective view of a keyboard showing the cursor control mechanism mounted therein.
Figure 2:
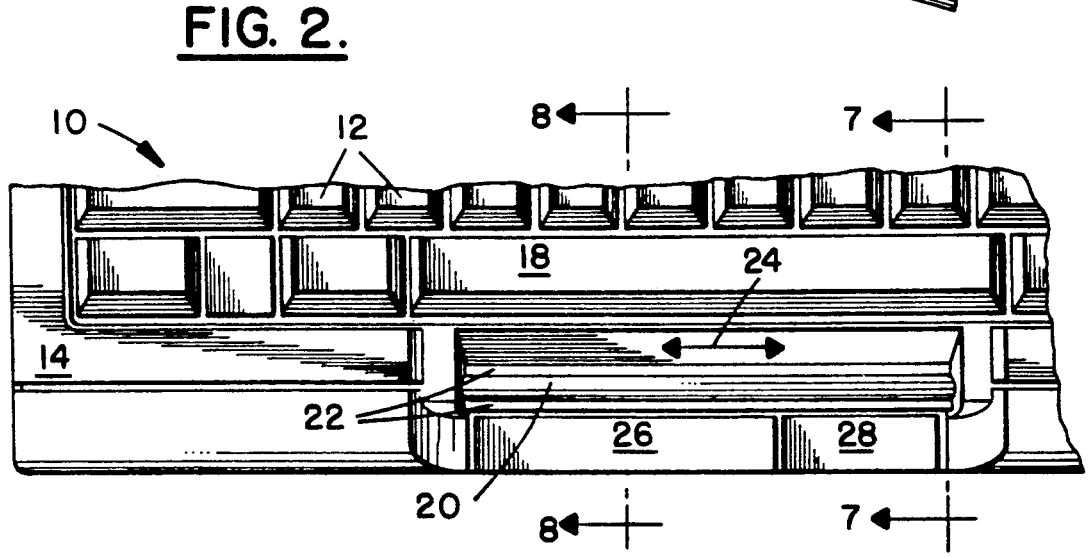
FIG. 2 is a top partial plan view of FIG. 1.
Figure 3:
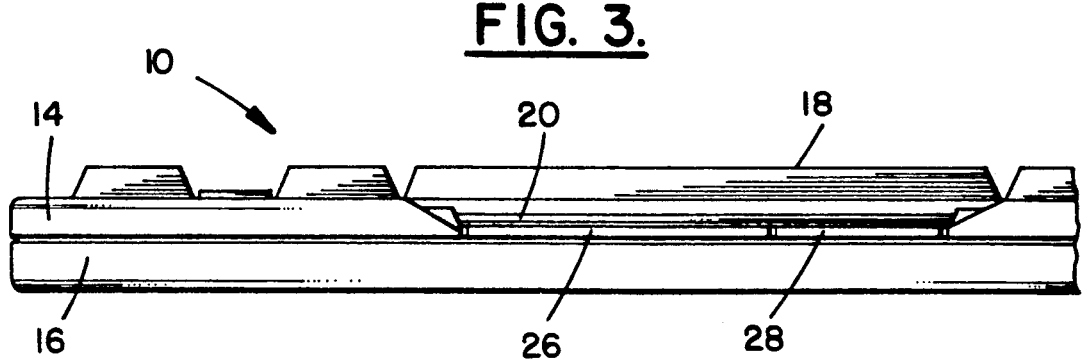
FIG. 3 is a front partial plan view of the keyboard shown in FIG. 1.

Referring now to FIGS. 1-3, a conventional keyboard 10 is shown in which the invention has been incorporated. Common numbering will be used throughout all the figures hereof for identical parts. Keyboard 10 comprises a plurality of keys 12, an upper cover 14 and a lower cover 16. Located immediately on the user side of space bar 18, in a recess formed in upper cover 14, is a roller 20 which is mounted for rotative movement in a moveable tray 22. Tray 22 both supports roller 20 and is movable, laterally, in the directions indicated by arrows 24. A pair of function keys 26 and 28 enable cursor selection functions to be accomplished and also provide support for tray 22.

Figure 12:
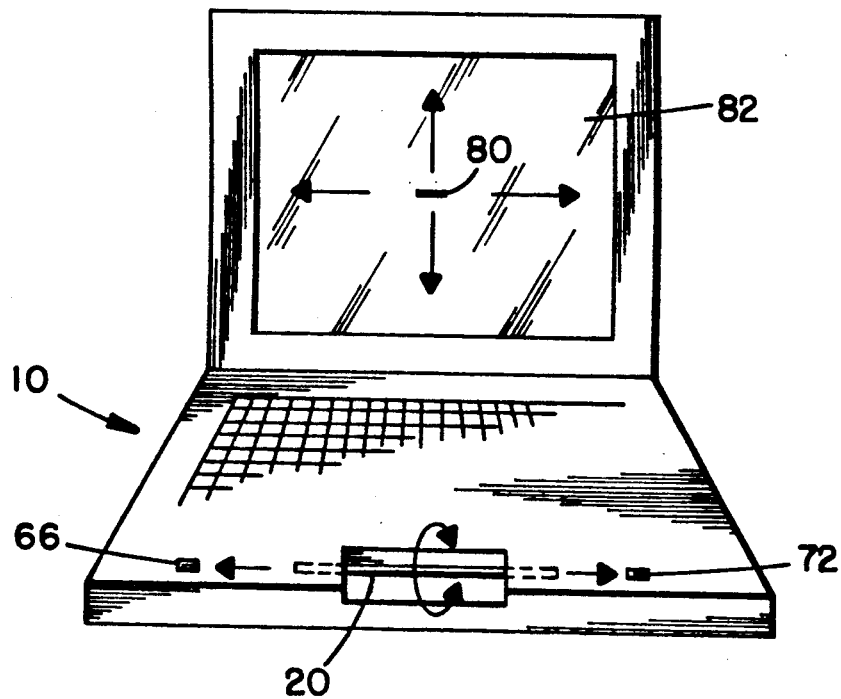
FIG. 12 is a schematic indicating how the motion of the cursor control mechanism effects the operation of a cursor on the display screen.

The combined movements of roller 20 and tray 22 enable position movement signals to be generated which control the position of a cursor (marker) on a display. This is schematically shown in FIG. 12.

Figure 4:
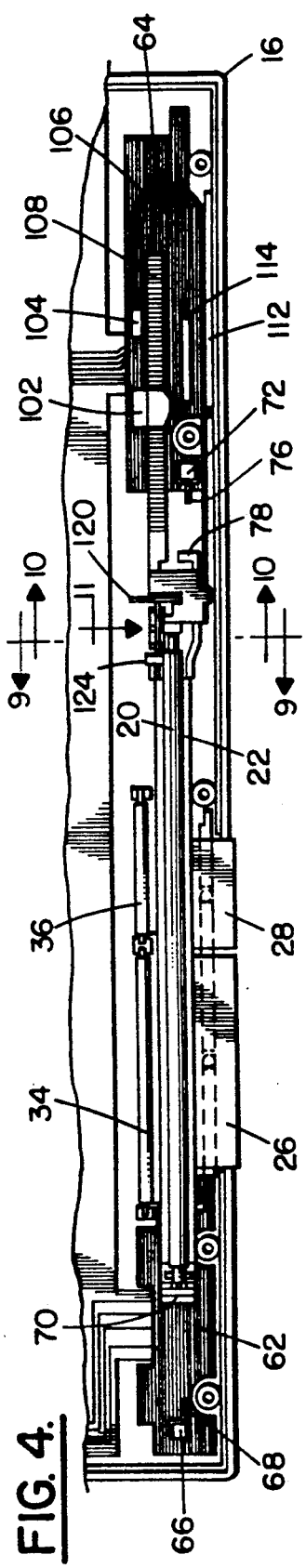
FIG. 4 is a top partial plan view of the cursor control mechanism of FIG. 1, with the upper cover removed.
Figure 5:
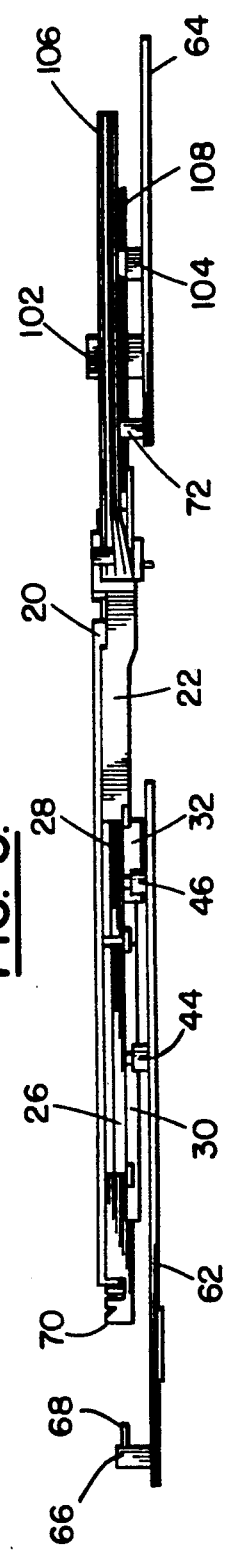
FIG. 5 is a front plan view of the cursor control mechanism with both the top and bottom covers removed.
Figure 6:
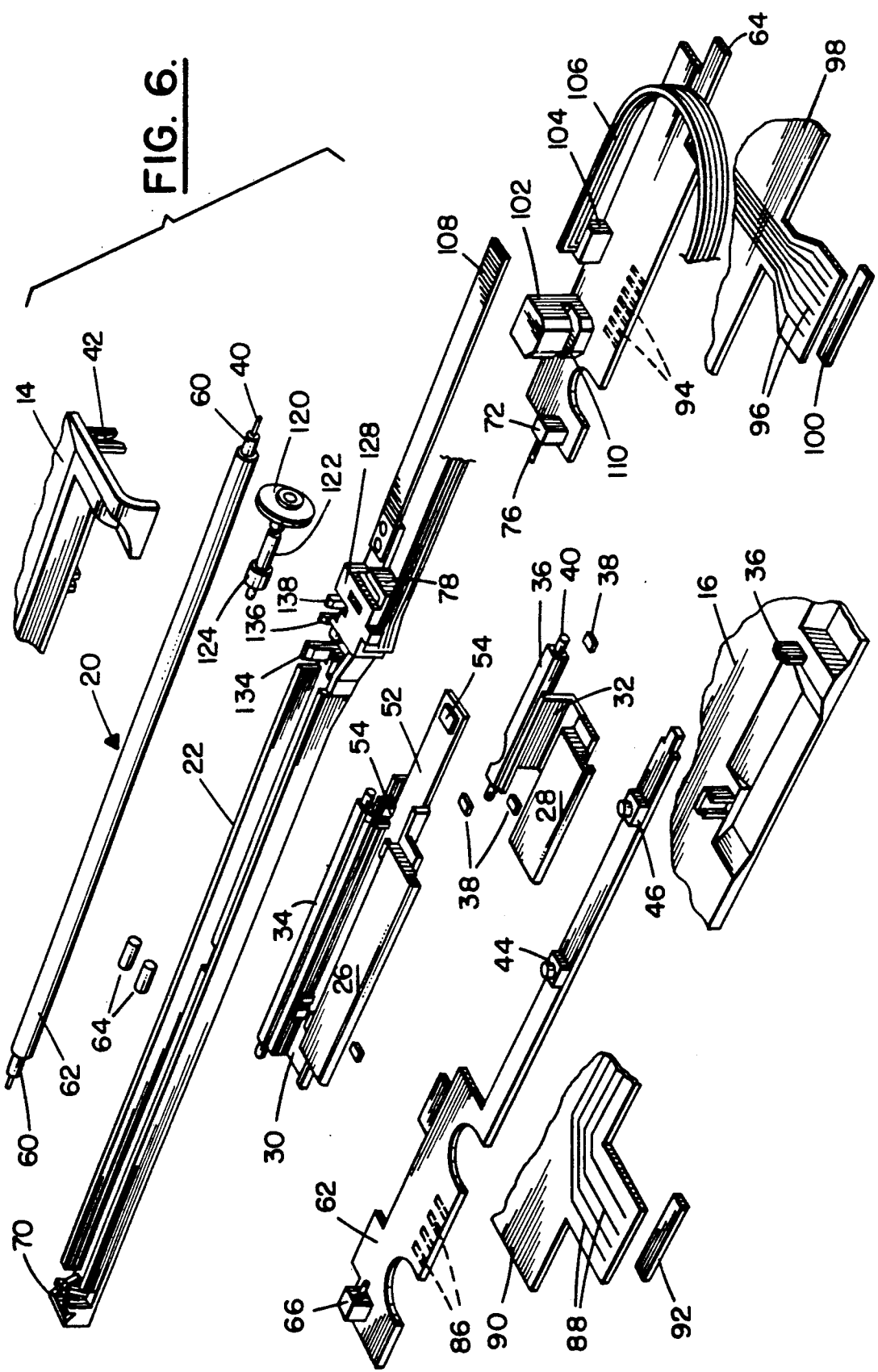
FIG. 6 is an exploded perspective view of the cursor control mechanism.

In FIGS. 4 and 5, upper cover 14 of keyboard 10 has been removed to expose the operating elements of the invention. In addition, in FIG. 5 lower cover 16 has also been removed to indicate a front, plan view of the parts which comprise the invention. FIG. 6 shows an exploded view of the parts shown in FIGS. 4 and 5.

Figure 7:
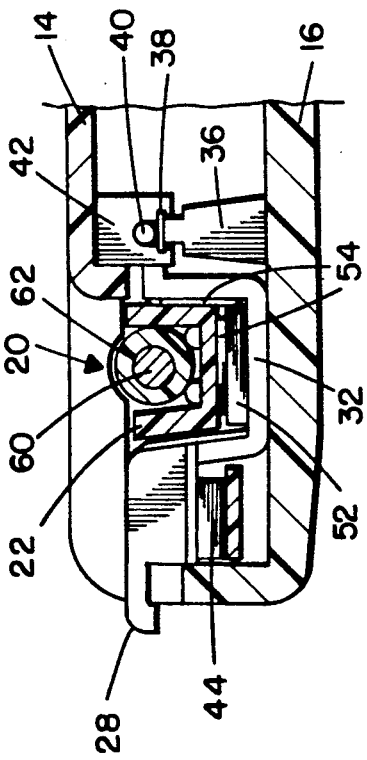
FIG. 7 is a section of FIG. 2 taken along line 7—7.

As above stated, roller 20 is mounted for rotational movement within tray 22. Tray 22 is slidably positioned within conforming portions 30 and 32 of function keys 26 and 28, respectively. Each of function keys 26 and 28 is mounted for pivotal movement on shafts 34 and 36 which are formed as integral parts of each of the keys. Shafts 34 and 36 are pivotally mounted in protrusions from the upper and lower covers 14 and 16 respectively. In FIG. 7, a section of this structure is shown and includes a post 36 supporting a teflon bearing 38. Axle portion 40 of key 28 extends from shaft 34 and is pivotally supported on bearing 38. A U-shaped clamp 42 extends downwardly from upper cover 14 and holds axle portion 40 in place.

Figure 8:
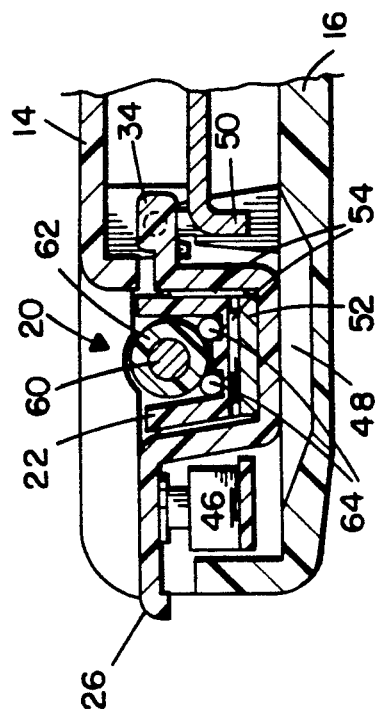
FIG. 8 is a section of FIG. 2 taken along line 8—8.

As shown in FIG. 5, function keys 26 and 28 rest on function switches 44 and 46. Those switches are spring biased upwardly and are actuated when one or the other of function keys 26 or 28 is depressed by the user. In FIG. 8, a section taken along line 8—8 in FIG. 2 illustrates the relationship of function switch 46 to function key 26. It is to be noted that lower cover 16 has a hollowed-out area 48 which allows both function keys 26 and 28 to be depressed so as to activate function switches 44 and 46. A bar 50 depends from lower cover 16 and acts as a stop for keys 26 and 28 when they are depressed.

As shown in FIG. 6, key 26 has a laterally extending portion 52 which protrudes into the conforming portion 32 of key 28. The extended portion 52 supports tray 22 so as to prevent it from tilting when it is slid to the far right end. There is sufficient clearance between extended portion 52 and conforming portion 32, so that key 26 and key 28 can be depressed independently. Depressing key 26 activates function switch 44 and depressing key 28 activates function switch 46. Note that a plurality of teflon pads 54 are in place within conforming portion 30 of switch 26. These pads provide bearing surfaces for tray 22 as it translates back and forth through conforming portion 30. Note also that this structure imparts lateral stability and physical support to tray 22 as it is operated.

As shown in FIGS. 7 and 8, roller 20 is comprised of a metal inner core 60 and a compliant outer covering 62 (e.g. polyurethane). A pair of roller bearings 64 promote rotative movement of roller 20 and prevent undo friction between it and tray 22.

Referring back to FIGS. 4, 5 and 6, a pair of circuit boards 62 and 64 provide circuit interconnections for various of the elements of the invention. Circuit board 62 provides both interconnections to and physical support for function switches 44 and 46. In addition, a left-limit switch 66 is mounted on circuit board 62 and has an actuating plunger 68 which engages left-end 70 of tray 22. A right-limit switch 72 is mounted on printed circuit board 64 and also has an actuating plunger 76 positioned to engage right-end 78 of tray 22.

When one of ends 70 or 78 impacts upon a limit switch plunger (see FIG. 12), the position of cursor 80 on screen 82 is caused to move to one side or the other of the screen. Thus, if limit switch 66 is activated by left-end 70 of tray 22, cursor 80 is caused to move to the leftmost side of screen 82. The actuation of right-limit switch 72 by end 78 is similar except that cursor 80 is caused to move to the rightmost limit of screen 82.

As shown in FIG. 6 and described above, circuit board 62 provides both physical support and electrical interconnections for function switches 44 and 46 and left limit switch 66. The circuit lines for each of these switches are brought out to electrical contacts 86 which are positioned on the underside of circuit board 62. When circuit board 62 is assembled onto lower cover 14, contacts 86 overlay electrical conductors 88 on sheet 90. A resilient pad 92 forces conductors 88 against contacts 86 and enables electrical connection therebetween. A similar arrangement exists at circuit board 64 where contacts 94 make contact with electrical conductors 96 on sheet 98. A similar resilient member 100 forces electrical conductors 96 against contacts 94 when circuit board 64 is assembled into lower cover 16.

Circuit board 64 also supports a linear encoding reader 102 and a plug 104 which connects to a flexible cable 106. A linear encoding strip 108 is fastened to the rightmost end of tray 22 and is threaded through opening 110 in linear encoding reader 102. As tray 22 translates along its extended axis, linear encoding strip 108 interacts with encoding reader 102 to provide signals indicative of such movement. Those signals are transferred to conductors (not shown) in circuit board 64 and then into the control circuitry of the display via contacts 94, conductors 96 etc.

Flexible cable 106 provides interconnections between circuit board 64 and a rotary encoding mechanism mounted on tray 20. As shown in FIG. 4, flexible cable 106 is positioned between a pair of guides 112 and 114 which extend from upper cover 114. These act to maintain the orientation of cable 106 as it is moved back and forth by the movement of tray 22.

Figure 9:
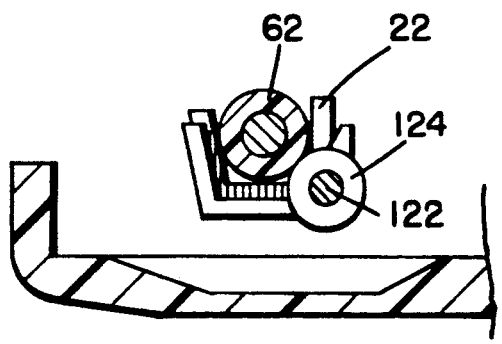
FIG. 9 is a section of FIG. 11 taken along line 9—9.
Figure 10:
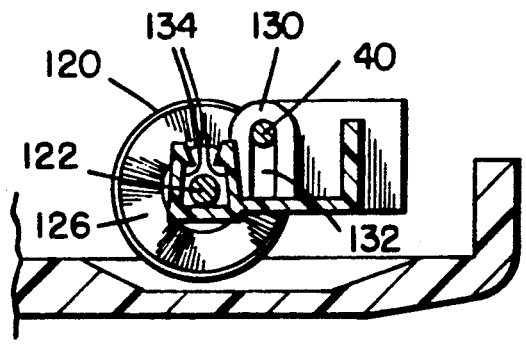
FIG. 10 is a section of FIG. 11 taken along line 10—10.
Figure 11:
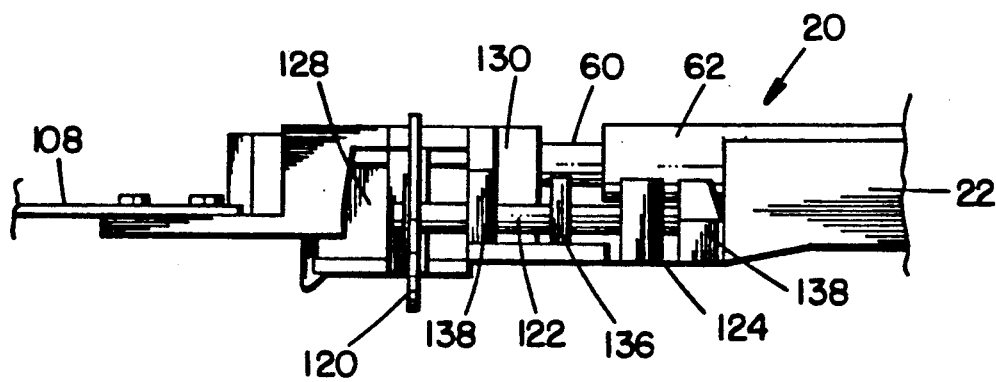
FIG. 11 is a plan view, from the rear, of the rotary encoding of the cursor control mechanism.

The rotary encoding mechanism will now be described with relation to FIGS. 4, 5, 6, 9, 10, and 11. The sectional views in FIGS. 9 and 10 are taken along the indicated lines in FIG. 4. FIG. 11 is a rear view of the rotary encoding mechanism. As is shown in FIG. 6, an encoder wheel 120 is affixed to shaft 122 which, in turn, has an actuating wheel 124 mounted thereon. The surface of encoder wheel 120 has a plurality of radial markings 126 which enable rotary motion signals to be derived. Those signals are generated within rotary encoding reader 128.

As shown in FIG. 10, which illustrates a sectional view looking to the right from line 10—10 in FIG. 4, axle 40 of roller 20 mates within inverted, U-shaped bearing member 130. Note that axle 40 is free to move up or down within opening 132 but is confined from horizontal movement by the vertical sides of U shaped bearing 130. As shown in FIGS. 6 and 11, shaft 122, which connects encoding wheel 120 to actuating wheel 124, is maintained in position by fingers 134, 136, and 138.

The above-described structure enables the entire rotary encoder to move with tray 22. Furthermore, when axle 40 of roller 20 is placed into opening 132 of inverted U bearing number 130, the resilient coating 62 on roller 20 bears down upon the periphery of actuating wheel 124. Thus, while inverted U bearing member 130 constrains the motion of shaft 40 (and roller 20) in the horizontal direction, in the vertical direction its weight freely bears upon actuating wheel 124. Thus, the pressure that roller 20 exerts on actuating wheel 124 is a function of gravity and is not subject to manufacturing tolerances of the various parts. Furthermore, note that the center line of shaft 122 is offset from the center line of roller 20, thereby enabling the rotary encoder to be offset and have a lower aspect ratio with respect to the upper surface of roller 20. This structure thus enables a simple connection between roller 20 and the rotary encoding mechanism, while enabling roller 20 to be positioned close to the surface of the keyboard for more ready access by the user. Additionally, the structure shown enables the entire rotary encoding mechanism to accurately encode the motion of roller 20 while it is being moved laterally by tray 22. Thus, the need for complex mechanical interconnections which are subject to wear and erroneous outputs is avoided.

It should be understood that the foregoing description is only illustrative of the invention. Various alternatives and modifications can be devised by those skilled in the art without departing from the invention. For instance, while the invention has been described as incorporated into a keyboard, it could be housed separately and positioned by the user at a convenient location adjacent the keyboard. Accordingly, the present invention is intended to embrace all such alternatives, modifications and variances which fall within the scope of the appended claims.

We claim:

1. A hand-operable input device for controlling the movement of a marker on a display screen, the device comprising:
   a tray having right and left ends, elongated along a first axis and mounted for translational movement along said first axis;
   a hand-operable roller, rotatably mounted on said tray and movable therewith;
   rotary encoder means mounted on and movable with said tray and in engagement with said roller, for providing signals indicative of rotary motion of said roller; and
   translational encoder means movable with said tray, for providing signals indicative of translational movement of said tray.

2. The input device as recited in claim 1 wherein said rotary encoder means comprises:
   a wheel positioned to engage said roller; and rotary means mounted in conjunction with said wheel for providing signals indicative of the rotation of said wheel.

3. The input device as recited in claim 2 further comprising:
   an asymmetric bearing cavity, horizontally confining an end of said roller, but enabling vertical movement thereof, said roller end, when positioned in said asymmetric bearing cavity, resting in frictional contact with said wheel of said rotary encoder means.

4. The input device as recited in claim 3 wherein said wheel and rotary means are mounted on said tray such that said wheel's axis of rotation is offset, in a horizontal direction, from said roller's axis of rotation.

5. The input device as recited in claim 4 wherein said roller is coated with a material exhibiting compliant frictional characteristics.

6. The input device as recited in claim further comprising:
   key means having a recess for slidably receiving said tray, said key means mounted intermediate said right and left ends.

7. The input device as recited in claim 6 wherein said key means comprises:
   a fixedly mounted switch; and
   a first key structure having two aspects and a portion which conforms to the tray, one aspect of said first key structure being pivotally mounted to enable rotation of said key structure and another aspect supported by said fixedly mounted switch, said key structure, when depressed by a human operator, rotating about said pivotal mount to actuate said switch.

8. The input device as recited in claim 7 wherein said switch means further comprises:
   a second fixedly mounted switch, and a second key structure shaped and pivotally mounted similarly to said first key structure, said first key structure having an arm which extends into the conforming portion of said second key structure to provide support for said tray, said second key structure independently operable from said first key structure.

9. The input device as recited in claim 1 further comprising:
   left and right limit switches mounted to engage said left and right ends of said tray, at respective left and right limits of said tray's travel, each of said limit switches actuated by engagement with an end of said tray.

10. The input device as recited in claim 9 further comprising:
    means responsive to an actuation of a limit switch, to move said marker to an extreme side limit of said display screen.

11. The input device as recited in claim 1 wherein roller bearings are positioned in said tray to support said roller.

* * * * *